Sept. 12, 1950　　　　　J. M. SCHUCH　　　　　2,522,304
BEET LOADER
Filed Dec. 26, 1946　　　　　　　　　　　　　　2 Sheets-Sheet 2
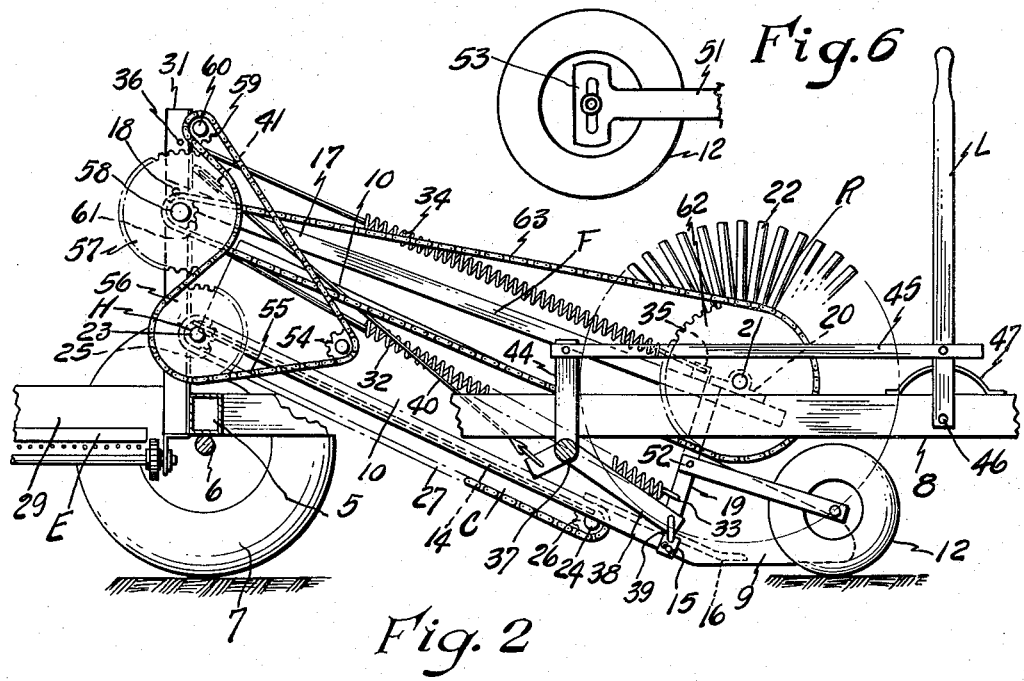
Fig. 6
Fig. 2
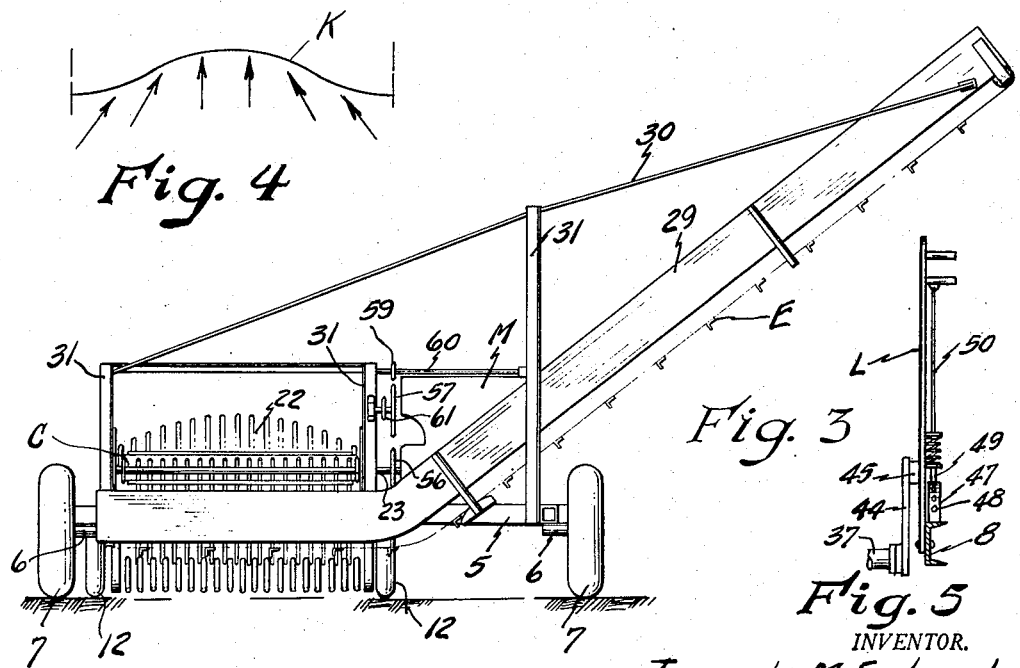
Fig. 4
Fig. 3
Fig. 5
INVENTOR.
Joseph M. Schuch.
BY Frank C. Fearman.
ATTORNEY Patented Sept. 12, 1950

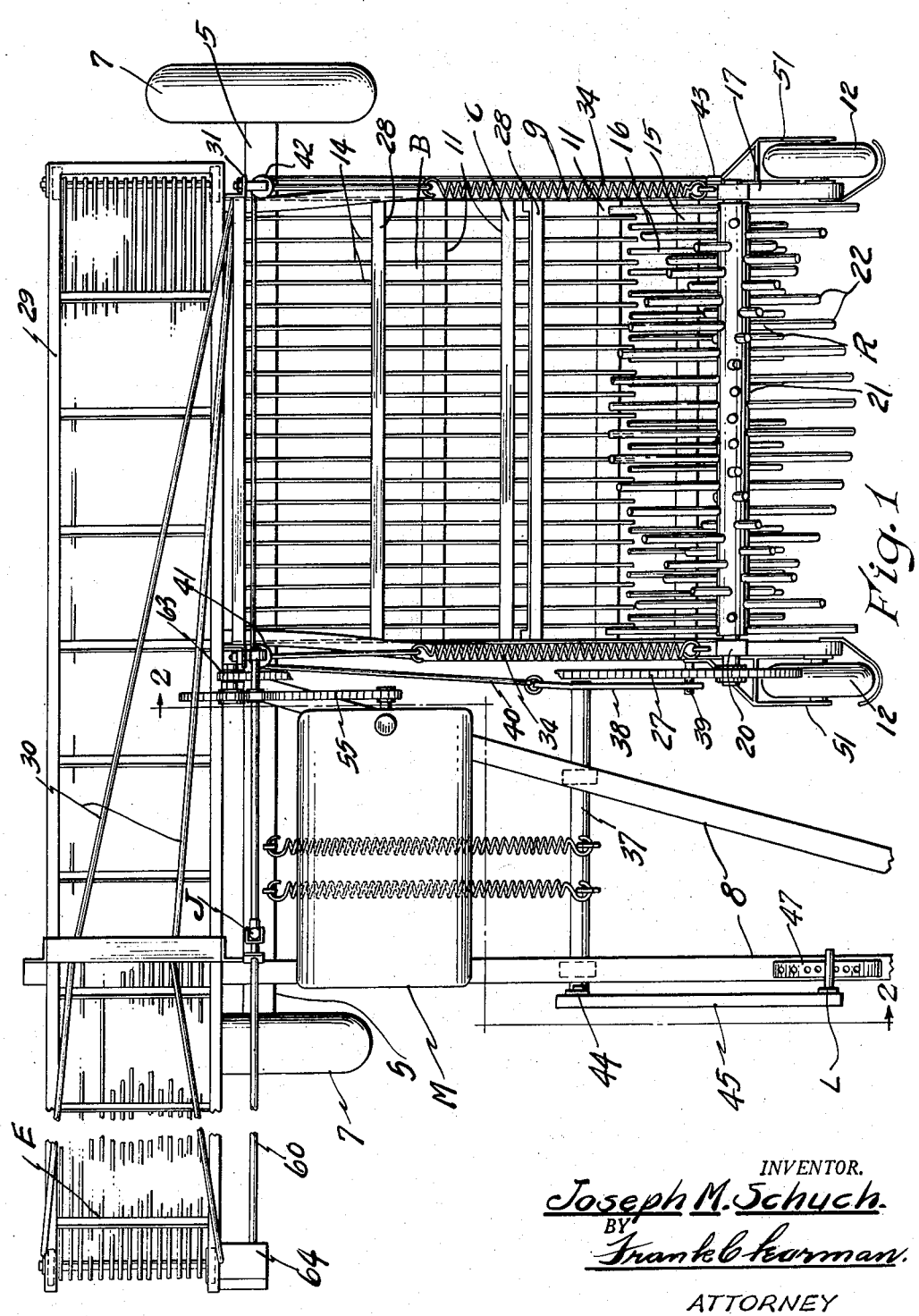

2,522,304

UNITED STATES PATENT OFFICE 2,522,304

BEET LOADER

Joseph M. Schuch, Unionville, Mich.

Application December 26, 1946, Serial No. 718,431

6 Claims. (Cl. 198—9)

This invention relates to beet loaders such as used in agricultural regions for loading beets from the ground into a truck, wagon, or similar vehicle.

One of the prime objects of the invention is to design a beet loader including a picker reel designed to pick up the beets from the ground, and provide means for adjusting said pick-up mechanism to suit the nature of the soil and conditions under which the loader is operated.

Another object is to provide a loader in which the pick-up reel is designed to crowd and guide the beets towards the center section of the picker, thereby insuring the picking up and loading of all of the beets in the direct path or area traversed by said picker.

A further object is to provide means whereby the carrier means is vertically adjustable by means of a single lever and as a unit, so that it can be accurately set to follow the contour of the ground over which the machine travels.

A further object still is to provide a picker reel frame having its one end hingedly connected to the main frame with its opposite end slidably supported on the carrier frame.

Still a further object is to design a very simple, practical, and relatively inexpensive labor-saving beet loader, by means of which the beets are mechanically loaded without the necessity of manual forking and loading.

A further object still is to provide a mobile beet loading machine which can be readily drawn by a tractor or other power vehicle, and by means of which the loading operation is easily and quickly accomplished, thereby materially shortening the time required to transport the beets to factory or other loading station.

With the above and other objects in view, the present invention consists in the combination and arrangement of parts, hereinafter more fully described, illustrated in the accompanying drawings, and more particularly pointed out in the appended claims, it being understood that changes may be made in the form, size, proportions, and minor details of construction, without departing from the spirit or sacrificing any of the advantages of the invention.

In the drawings:

Fig. 1 is a top, plan view of my improved beet loading machine.

Fig. 2 is a fragmentary, side-elevational view thereof.

Fig. 3 is a rear-elevational view.

Fig. 4 is a diagram illustrating the pattern formed by the picker reel spokes.

Fig. 5 is an edge-elevational view of the carrier from adjusting lever.

Fig. 6 is an enlarged, fragmentary view illustrating the mounting of the carrier frame wheels.

Referring now to the drawings in which I have shown the preferred embodiment of my invention. The numeral 5 indicates the main frame of the machine which is supported on axles 6 on which ground-engaging wheels 7 are journaled in the usual manner. A forwardly projecting tongue 8 forms a part of the frame 5 and is adapted to be attached to a tractor or other power vehicle by means of a suitable hitch (not shown).

An inclined, forwardly-projecting carrier frame 9 forms a part of the loader and includes side plates 10 hingedly connected to the main frame at the point H, these plates being connected by means of transversely disposed bars 11, and wheels 12 are journaled on the front end of the carrier frame as shown.

A plurality of spaced-apart rod members 14 are mounted on the bars 11 and form the bed of the carrier, and another transversely disposed bar 15 spans the front end of the carrier frame, a plurality of inclined, spaced-apart teeth 16 being mounted thereon, and the front ends of the teeth are formed with a slight upward bend so that they ride even with or slightly below the surface of the ground over which they travel, the rear ends overhanging the front ends of the rod members 14 so that the product being loaded readily flows to the conveyor C.

A reel frame F is associated with the carrier frame 9 and comprises spaced bar members 17, pivotally connected to the main frame at 18, the outer ends of said bars being slidably mounted in a bifurcated member 19 provided on the upper edges of the carrier frame 9.

Bearings 20 are mounted on the outer ends of the members 17, and a picker reel R is journaled therein, said reel comprising a shaft 21 said shaft being drilled to accommodate the radially disposed picker spokes 22 which are mounted therein, each horizontal line of spokes being bowed from end to end to form a predetermined curve, (see Fig. 4), so that the beets are always forced inwardly towards the center section of the reel, as indicated by the arrows, thereby insuring the picking up and loading of all of the beets and forcing them over the teeth 16 and onto the conveyor B of the carrier.

The conveyor C forms a part of the carrier assembly, and includes spaced-apart shafts 23 and 24 on which sprockets 25 and 26 are mounted, conveyor chains 27 being trained over these sprockets, and bars or flights 28 connect said chains so that beets thrown on the carrier bed or rods 14 will be carried upwardly towards the rear of the machine and discharge into an elevator trough 29 in which a conventional elevating conveyor E is mounted; thence the beets are elevated and discharged into a truck or wagon, (not shown), as the machine is operated. Cables 30 are anchored to the uprights 31 of the carrier superstructure and to the wall of the conveyor trough for suitably bracing and reinforcing said elevator trough.

The carrier C has considerable overhang, and to counterbalance and aid in supporting the front end thereof, springs 32 are connected to the outer end of the carrier at the point 33, and to the frame uprights 31 at a point above the hinge point H to provide an upward pull on the outer end of the carrier frame, and any lowering of the carrier frame will automatically tension the springs accordingly.

The picker reel frame is tensioned in a manner similar to the carrier frame, similar springs 34 being connected to the members 17 at the point 35, and to the uprights 31 at the point 36, thus providing for necessary flexibility, and it will be apparent that this also provides a resilient mounting that permits the picker reel to accommodate itself to any change in the contour of the ground over which it travels.

The front end of the carrier structure C is readily adjustable about the pivot point H, a transversely disposed shaft 37 being journaled in suitable bearings provided on the tongue 8, and a link 38 is mounted on said shaft at a point intermediate its length, the forward section of said link being connected to the cross bar 11 by means of a short chain 39, and a cable 40 is connected to the opposite end of said link, said cable leading around sheaves 41 and 42 provided on the uprights 31, thence leading outwardly and being anchored to the forward end of the carrier frame at the point 43.

A crank 44 is mounted on the one end of the shaft 37, and a link 45 connects the crank 44 with the hand lever L which is pivotally mounted on the tongue 8 at the point 46, a quadrant 47 being mounted on the tongue, and openings 48 are provided therein for engagement by a dog 49 operable from the spring pressed latch member 50 which is slidable on the hand lever.

The carrier frame wheels 12 are mounted in a wheel yoke 51 as shown, this yoke being connected to the carrier frame at the point 52, said wheels being vertically adjustable in slotted plates 53 which form a part of the yokes and are adjustable independently of the carrier frame. The carrier frame is adjustable by manipulation of the lever L, rocking of the shaft 37 serving to raise or lower the front end of the frame accordingly.

A motor M is provided on the main frame and a drive gear 54 is provided thereon, a chain 55 leading around said gear, thence around a gear 56 provided on the shaft 23; thence the chain leads up and around a gear 57 which is mounted on the shaft 58 and thence around the gear 59 provided on the shaft 60.

The picker reel R is also driven from the motor M, a small gear 61 being provided on the shaft 58, and a large gear 62 being provided on the reel shaft 21, a chain 63 serving to drivingly connect these gears, so that the picker reel and the conveyor C are simultaneously driven.

The conveyor E is also driven from the motor M, the shaft 60 leading upwardly to a reducer box 64 mounted on the upper end of the trough 29, and this is connected to the upper shaft 60 in the conventional manner, a universal joint J being provided intermediate the length of the shaft 60 as shown.

In practice, the lever L is operated to raise or lower the front end of the carrier frame C and picker reel R, the outer end of the reel frame sliding on the carrier frame when the adjustment is made; the motor M is then started to drive the picker reel, conveyor C, and elevator E, the front ends of the teeth 16 being substantially even with or slightly depressed in the ground, and as the picker reel R is driven, it throws the beets (not shown) upwardly on the teeth 16, and onto the conveyor C which carries them upwardly and discharges into the trough 29, the elevator E carrying them upwardly and discharging into a truck or wagon (not shown), that travels along with the loader.

The springs 32 and 34 serve to counterbalance the front end of the carrier frame, and picker reel frame respectively, both of which are readily adjustable by manipulation of the lever L which raises or lowers the frame by means of the linkage and as previously described.

From the foregoing description, it will be obvious that I have perfected a very simple, practical, and substantial beet loader for loading beets and similar agricultural products.

What I claim is:

1. A beet loading machine of the class described, comprising a mobile main frame, a transversely disposed loading elevator provided on the rear end thereof, a forwardly extending carrier frame hingedly connected at its rear end to the main frame, a draft tongue forming a part of the main frame, vertical posts on said frame, a manually operable adjusting lever on said tongue, sheaves on said posts above said carrier frame, and a cable connected to said lever and trained around said sheaves, with its outer end anchored to the outer end of the carrier frame for vertically adjusting said frame with relation to the surface of the ground when the lever is actuated.

2. A beet loading machine of the class described comprising, a mobile main frame, a transversely disposed loading elevator provided on the rear end thereof, a forwardly extending carrier frame hingedly connected at its rear end to the main frame, wheels on the front end of said carrier frame, a conveyor mounted thereon and discharging into said loading elevator, a transversely disposed tine bar spanning the carrier frame having a plurality of forwardly extending tines mounted thereon and overhanging said conveyor, a picker reel mounted on the carrier frame directly ahead of the tine assembly and adapted to cooperate with the tine assembly to force beets onto the lower end of the conveyor which discharges into said loading conveyor, sheaves on the main frame above the carrier frame, an adjusting lever on the main frame, and flexible means trained over said sheaves and connected to said lever and to the front end of the carrier frame respectively for vertically adjusting said frame with relation to the surface of the ground when the lever is actuated.

3. A beet loading machine of the class described, comprising a mobile main frame, a transversely disposed loading elevator provided on the rear end thereof, a forwardly extending carrier frame hingedly connected at its rear end to the main frame, wheels on the front end of said carrier frame, a conveyor mounted thereon, a transversely disposed tine bar spanning the carrier frame, a forwardly extending tine assembly mounted on the tine bar with one end overhanging said conveyor, a picker reel carried by the carrier frame directly ahead of said tine assembly and adapted to cooperate with the tine assembly to force the beets onto the lower end of the conveyor which discharges into said loading elevator, a draft tongue forming a part of the main frame, vertical posts on said main frame, a manually operable adjusting lever on said tongue, sheaves on said posts above the carrier frame, and a cable connected to said lever and trained around said sheaves with its outer end anchored to the outer end of the carrier frame for vertically adjusting said frame with relation to the surface of the ground when the lever is actuated, and means for driving said conveyor, picker reel, and elevator respectively.

4. A loading device of the character described, comprising a mobile main frame, a forwardly extending carrier frame hingedly connected to the main frame, wheels on the outer end thereof, means for adjusting said wheels with relation to said frame, a reel and reel frame mounted on the carrier frame, said reel frame being hingedly connected at its inner end to the main frame, with its outer end slidable on the carrier frame, an elevator trough on the back of the main frame, a loading elevator operable in said trough, a conveyor on the carrier frame and discharging into said elevator trough, posts on the main frame and springs connected to the upper end sections of the posts and to the outer ends of the carrier frame and reel frame respectively.

5. A beet loading machine of the class described comprising, a mobile main frame including a draft tongue having a manually operable adjusting lever thereon, vertical posts on the main frame, a transversely disposed loading elevator provided on the rear end of said main frame, a forwardly extending carrier frame hingedly connected at its rear end to the main frame, sheaves mounted on said posts above the carrier frame, wheels on the front end of said carrier frame, a conveyor mounted thereon, a forwardly extending tine assembly mounted on the carrier frame and overhanging said conveyor, a picker reel on said carrier frame directly ahead of said tine assembly and adapted to cooperate with the tine assembly to force the beets onto the lower end of the conveyor for discharge into said loading conveyor, a cable connected to said adjusting lever and trained around said sheaves with its outer end anchored to the outer end of the carrier frame for vertically adjusting said frame with relation to the surface of the ground when the lever is actuated, and means for driving said conveyor, picker reel, and loading elevator respectively.

6. A beet loading machine of the class described comprising, a mobile main frame, a transversely disposed loading elevator provided on the rear end thereof, a forwardly extending carrier frame hingedly connected at its rear end to the main frame, wheels on the front end of said carrier frame, a conveyor mounted thereon, a forwardly extending tine assembly mounted on the carrier frame and overhanging said conveyor, a picker reel on said frame directly ahead of said tine assembly, spokes on said picker reel and arranged to progressively force the beets towards the cention section of the reel, said reel cooperating with the tine assembly to force the beets onto the lower end of the conveyor for discharge into said loading conveyor, and means for driving said conveyor, picker reel, and loading elevator respectively.

JOSEPH M. SCHUCH.

REFERENCES CITED

The following references are of record in the file of this patent:

UNITED STATES PATENTS

| Number | Name | Date |
|---|---|---|
| 885,486 | Kent | Apr. 21, 1908 |
| 1,070,065 | Pfile | Aug. 12, 1913 |
| 1,726,604 | Amen | Sept. 3, 1929 |
| 2,174,605 | Spencer, Jr. | Oct. 3, 1939 |
| 2,208,128 | Holbrook et al. | July 16, 1940 |
| 2,256,830 | Johnson | Sept. 23, 1941 |